March 17, 1959  I. F. THOMSON ET AL  2,878,357
ELECTRIC HEATED LAMINATED GLASS PANEL
Filed July 13, 1956
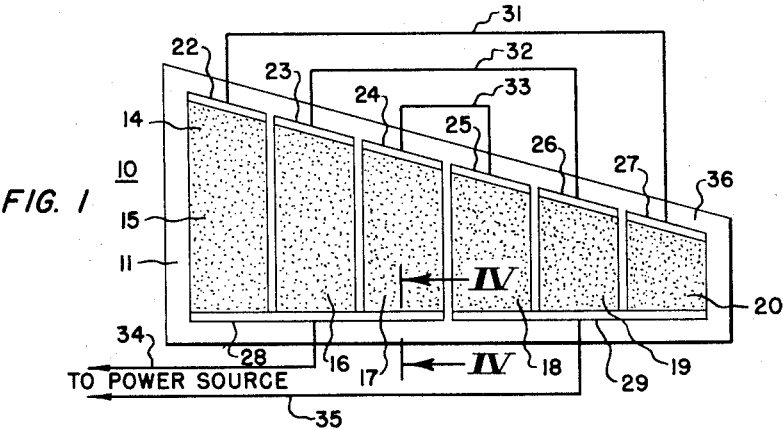
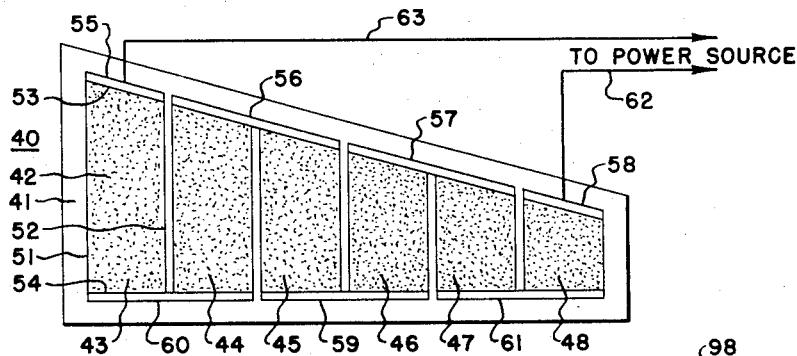
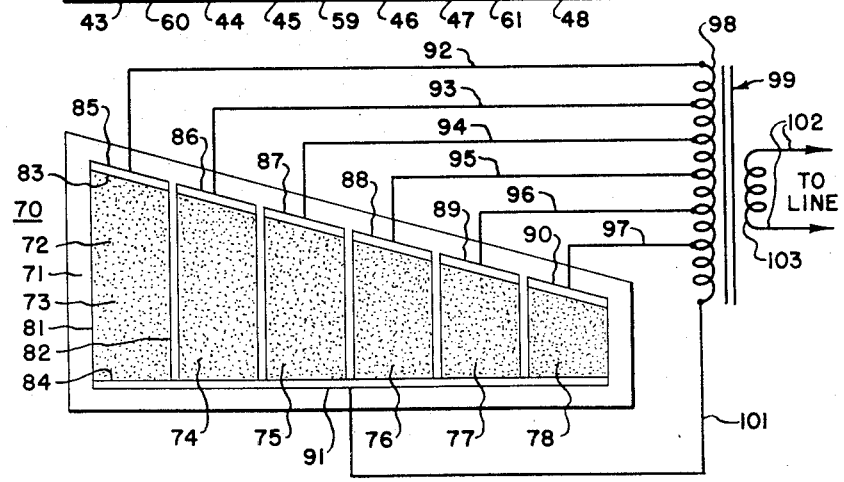
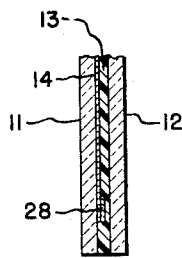
INVENTORS
IAN F. THOMSON &
DONALD G. WILSON
BY
*Walter J. Jason*
ATTORNEY United States Patent Office 2,878,357
Patented Mar. 17, 1959

2,878,357

ELECTRIC HEATED LAMINATED GLASS PANEL

Ian F. Thomson and Donald G. Wilson, San Diego, Calif., assignors to General Dynamics Corporation, San Diego, Calif., a corporation of Delaware Application July 13, 1956, Serial No. 597,737

10 Claims. (Cl. 201—73)

The present invention relates to laminated glass panels adapted to be used in areas where icing conditions occur and more particularly to laminated glass panels embodying improved means for electrically heating the same to prevent fogging thereof or the formation of ice thereon.

This invention has particular application in connection with windshilds or canopies for airplanes or other vehicles which embody glass panels of unusual configuration where the commonly used methods of electrically heating these panels does not afford uniform or effective heat throughout the entire surface areas thereof.

Windshields used in the pilot's enclosure of present day aircraft vary widely in peripheral configuration from one type of aircraft to another, the configuration being determined by the aerodynamic requirements of the airplane body of the particular aircraft. With the advent of airplanes capable of supersonic flight speeds, aerodynamic demands became such that canopies for the pilot's compartment could no longer consist of the usual box-like enclosures but it was frequently required that they be resolved into multiple odd-shaped facets of glass held in a frame the shape of which was commensurate with the particular airplane design. However, heating a panel of glass which is of unusual configuration effectively to prevent ice formation thereon gives rise to difficulties.

A method commonly used for preventing the formation of ice on windshields of present day aircraft is to make the windshields of laminated construction and to employ electric current to produce heating of such windshields. Contemporary windshields employ laminated glass structures usually comprising two or more sheets of glass with one or more thermoplastic layers of a material such as polyvinyl butyral, interposed, and all suitably bonded together under heat and pressure into a composite unitary structure. Commonly, heat is provided to this structure by the use of an electrically conductive, transparent, layer which is applied to the outer or inner side of one of the glass sheets. Electrical connection is made to the conductive layer through buses located on opposite edges of the windshield and heat is developed in the conductive layer upon the flow of electric current therethrough. The resistance of this conductive layer is such that there can be generated heat of a temperature sufficient to raise the temperature of the exposed surface of the windshield above the freezing temperature of water.

To heat a glass panel uniformly and avoid localized or uneven heat distribution the pair of bus bars used to supply current to the conductive layer are located substantially parallel one to the other at opposite edges of the panel. However, when the windshield construction must be such that unusual shapes are encountered, that is, shapes other than generally rectangular, obtaining uniform heating of the glass panel becomes difficult. For instance, where a generally triangular shape of glass is employed the bus bars disposed at the outer edges will, of course, not be parallel but will be in generally converging relationship. With the bus bars so disposed, since current follows the path of least resistance, i. e., here the shortest distance of travel across the conductive layer, the result is that there is overheating in the area of the apex while the base area remains relatively cool, in fact, too cool to be effective to prevent ice formation.

It is therefore an object of the present invention to provide improved means for uniformly heating electrically conducting laminated glass panels of unusual configurations.

Another object of this invention is to provide an improved construction for an electrically heated laminated glass panel structure which permits uniform heating thereof without impairment of visibility therethrough irrespective of the shape or size of the structure.

Another object of this invention resides in providing an electrically conducting laminated glass panel of improved construction embodying an electrically conductive layer wherein such conductive layer is divided into a plurality of sections separated from each other and having a plurality of conductors associated therewith to provide a plurality of current paths.

Another object of this invention is to provide an improved electrically conducting laminated glass structure having a plurality of separate heating areas, with such areas having a predetermined heat relationship therebetween.

Other objects and features of the present invention will be readily apparent to those skilled in the art from the following specification and appended drawing wherein is illustrated a preferred form of the invention, and in which:

Figure 1 is a view in plan of a laminated glass panel in accordance with the present invention but with the transparent electrically conductive film shown in outline and stippled for illustrative purposes, the electrical circuit for the panel being illustrated schematically;

Figure 2 is a modification of the panel of Figure 1 which embodies a series circuit electrical connection for the electrically conductive film;

Figure 3 is another modification which embodies still another form of electrical connection; and Figure 4 is a fragmentary sectional view taken along line IV—IV of Figure 1.

Referring now to the drawings and particularly to Figures 1 and 4 there is shown an electrically conductive glass laminate unit which is generally indicated by the numeral 10. This unit, as shown, has a trapezoidal configuration, which configuration is to be considered as illustrative of an unusual shape for an electrically conductive panel, that is, a shape which will not efficiently accommodate normal parallel placement of buses for uniform heating of the conductive lamina.

Laminated unit 10 comprises two sheets 11 and 12 of conventional transparent tempered glass and a layer 13 of flexible thermoplastic material, which may be polyvinyl butyral, interposed between the glass sheets, these laminae being arranged in parallelism in face-to-face contact and all suitably bonded together under heat and pressure into a composite unitary structure.

Prior to the laminating operation the inner face of the outer glass sheet 11 is provided with a layer or film 14 of transparent, electrically conductive material, though for purposes of illustration it has been shown stippled and outlined. This material, it is understood, is of conventional composition and is readily commercially available. For example, it may be a clear, transparent film of tin oxide of the nature disclosed in Patent No. 2,429,420, dated October 21, 1947, to Harold A. McMaster. The film can be formed on the glass by heating the glass approximately to its softening point and then spraying the desired surface with a solution of stannic tetrachloride to effect a deposit of tin oxide as a film on the glass.

It is understood, however, that it is within the contemplation of this invention that the film may be composed of any material having the requisite chemical and physical characteristics to enable its application to glass to provide a film which will conduct electricity and by reason of the electrical resistance thereof generate heat.

As is apparent from the drawing, film 14 applied to glass 11 is not a continuous layer but rather is composed of a plurality of sections which in Figure 1 are indicated by the numerals 15, 16, 17, 18, 19 and 20, each section being separated from adjacent sections by untreated strips or areas of glass identified by the numeral 21. In the application of the film material a suitable mask is used so that the desired sectionalizing of the film is achieved. Each of the sections 15, 16, 17, 18, 19 and 20 composing the interrupted film pattern has generally the same configuration as the glass panel which carries these sections, this configuration, as shown, embodying two parallel sides, a right angle side, and an inclined side.

Also prior to the laminating operation each of the film sections 15, 16, 17, 18, 19 and 20 is provided with suitable electrodes for the application of electrical energy thereto. As shown in Figure 1, narrow, elongated buses 22, 23, 24, 25, 26 and 27 are provided at, and co-extensive with, the inclined edges respectively of sections 15, 16, 17, 18, 19 and 20. Thus, each of the inclined edges of the various sections has a separate bus. However, at the opposite or right angle sides of these sections a common bus 28 is provided for sections 15, 16 and 17, and a common bus 29 for sections 18, 19 and 20.

The buses provided for the film sections are composed of a suitable electrically conductive material which may be applied in any convenient manner such as by brushing or spraying. Silver paste or a silver amalgam is usually used since these materials are readily applied and are economical to employ. However, the buses may, if desired, be made of sprayed copper, copper foil or platinum.

After the buses are in place they may be electroplated with copper to permit the ready attachment, as by soldering, of electrical leads thereto to provide electrical energy to the various sections of conductive layer 14. If desired, the electrical leads need not be connected directly to the buses, but a strip of copper foil may be soldered at one end to each bus and have its opposite end projecting to the exterior of the panel. The electrical lead for the bus may then be appropriately connected to the projecting end of the copper foil. It is understood that this invention is not concerned with the particular manner of effecting connection between a bus and an electrical lead. A series-parallel electrical circuit is afforded the laminating structure of Figure 1 and comprises a lead 31 which interconnects film sections 15 and 20, a lead 32 which interconnects film sections 16 and 19, and a lead 33 which interconnects sections 17 and 18. Bus 28 which is common to sections 15, 16 and 17 is connected to a suitable power source through an electrical lead 34 and bus 29, common to sections 18, 19 and 20 connects through a lead 35 to the opposite pole of this power source.

With the bus bars in place glass 11 is then combined with glass 12 and the thermoplastic layer 13 and formed under suitable heat and pressure into a composite unit. The film coated surface of glass 11 will preferably be located on the inward side in this laminated glass-plastic unit.

As stated above, the film sections which are disposed on glass 11 are electrically interconnected in pairs at their inclined edges, with sections 15 and 20, sections 16 and 19, and sections 17 and 18 paired. To obtain substantially uniform heating of glass 11 throughout the area of visibility the combined surface areas of each pair of such pairs of sections is substantially equal one to the other. Preferably, also, the widths of each of the sections are substantially equal one to the other. The total resistance of each pair of sections is, accordingly, substantially equal to the total resistance of each of the other pairs of sections. Since the resistance value of each of the pairs of sections is substantially equal, the current supplied to the system will be substantially equally divided among the various pairs of sections so that the heat developed will be substantially uniform throughout the entire surface of the glass 11. Of course, it is understood that usual control equipment may be employed to supply and maintain a predetermined current which is sufficient, when passed through the film sections, to generate heat of a temperature which will maintain the temperature of the outer surface of glass 11 at the desired value to prevent the formation of ice thereupon.

It is understood that the invention is not limited to the use of the precise number of film sections illustrated in Figure 1. The invention contemplates the use of any number of pairs of sections as may be calculated to be necessary to achieve uniform heating. Since the outline dimensions of each film section are considerably smaller than the outline dimensions of the glass 11 the likelihood of localized heating occurring is substantially completely eliminated.

Although the various conductive film sections are separated from one another by areas 21 of untreated glass such areas are of sufficiently small widths that the heat developed at the film covered areas will be sufficient through conduction to heat such areas 21 and raise them to the required temperature to prevent ice formation at such areas.

As shown in Figure 1 the film sections 15-20 occupy generally the central area only of the present unit and an untreated peripheral margin 36 is provided adjacent the edges of the glass panel in surrounding relationship to the sectionalized film covered area. The margin 36 is provided to accommodate the usual mounting structure (not shown) which attaches the present glass laminate unit 10 in position to the airplane, or vehicle, or other apparatus which is to use unit 10. The present invention is not concerned with the manner of mounting unit 10 nor with the particular attaching devices employed, any suitable method and means may be employed.

In the modification of Figure 2, the electrically conductive glass laminated unit is designated in its entirety by the numeral 40. For convenience in describing the invention, the configuration of this second embodiment is also shown as being generally trapezoidal. Its construction is similar to the construction of glass laminated unit 10 of Figure 1 in that it includes a pair of glass sheets with an interposed layer of thermoplastic material all suitably bonded together into an integral glass-plastic sandwich. For purposes of convenience of description it will be assumed that the outline of the outer glass panel is being viewed and it will be indicated generally by the numeral 41. Glass panel 41, as with glass panel 11, has provided on its inner surface a layer or film 42 of transparent, electrically conductive material having the same composition as conductive layer 14 above described.

Here, as in the first embodiment, the conductive layer 42 applied to the inner face of glass panel 41 is not continuous but is composed of a plurality of sections of equal widths indicated in Figure 2 by the numerals 43, 44, 45, 46, 47 and 48 which are separated from each other by untreated strips or areas of glass. It is understood that these film sections are transparent and do not interfere with vision through the laminated glass unit and that it is only for illustrative and descriptive purposes that the sections are shown stippled and their outline made apparent. Sections 43, 44, 45, 46, 47 and 48 conform generally in outline to one another each having spaced parallel edges 51 and 52, an inclined edge 53 and a right angle edge 54.

To provide for the introduction of electrical energy to the various film sections and to place them in electrical series circuit suitable electrodes are associated with such sections. As illustrated, a narrow, elongated bus 55 is formed at and substantially co-extensive with the inclined edge 53 of section 43, the inclined edges 53 of sections 44 and 45 are joined by a common bus 56 which extends the full length of the two inclined edges, the inclined edges 53 of sections 46 and 47 are likewise also interconnected by a common bus 57, and section 48 is provided with its own co-extensive bus 58 at its inclined edge 53. At the opposite or right angle sides 54 of these various sections a common co-extensive bus 60 is provided for sections 43 and 44, a like common co-extensive bus 59 interconnects sections 45 and 46, and sections 47 and 48 are joined by common co-extensive bus 61. Single bus bar 55 of section 43 and single bus bar 58 of section 48 are connected to a suitable source of power through usual electrical conductors 62 and 63, respectively. It is apparent that the path of the electric current provided to the buses will be through the film sections 43 through 48 successively.

The various buses are formed of usual suitable electrically conductive material which may be silver paste or silver amalgam as in the first embodiment and may be electroplated with copper to permit the soldering thereto of the electrical leads for the electrical system of this embodiment.

The current supplied to the set of film sections 43—48 will in passing through these sections generate heat to raise the temperature of unit 40, the current being of sufficient value to achieve the desired temperature. Here again, as many film sections may be employed as may be calculated to be required to effect substantially uniform heating throughout the viewing area of the glass unit. The possibility of localized heating occurring is substantially effectively eliminated by the use of a multiplicity of heated areas whose outline dimensions are of sufficiently small order as to substantially avoid any great disparity of heat development along the length of each section.

The modification illustrated in Figure 3 is also a laminated electrically conductive glass unit, designated generally by the numeral 70, which is similar to the embodiments of Figures 1 and 2 in that it includes a pair of glass sheets having a thermoplastic layer therebetween. It, too, is shown as being of generally trapezoidal shape to illustrate an unusual shape of glass panel. Here again, as in the discussion of the embodiment of Figure 2, it will be assumed for sake of convenient description that the outline of the outer glass panel is being viewed. This panel is indicated in the drawing generally by the numeral 71.

To the central area of the inside surface of glass panel 70, as in the other embodiments, there is applied a noncontinuous layer 72 of a suitable electrically conductive material which may be of the same composition as described and employed above. Layer 72 is composed of a plurality of sections 73, 74, 75, 76, 77 and 78 of equal widths separated one from the other by untreated areas of glass. Again, these film sections are shown in outline and stippled for ease of description, it being understood that the film is transparent and does not interfere with vision through the glass panel. These sections are of a shape conforming generally to the shape of the glass panel and each has a pair of parallel edges 81 and 82, an inclined edge 83 and a right angle edge 84.

As with the film sections of the other embodiments electrodes formed of suitable electrically conductive material such as silver paste or silver amalgam are associated with the present film sections. As shown, film sections 73, 74, 75, 76, 77 and 78 are provided at, and co-extensive with, their inclined edges 83 with, respectively, narrow, elongated buses 85, 86, 87, 88, 89 and 90. At the opposite, or right angle sides 84, of these film sections there is formed a single bus 91 common to all of the film sections and extending completely across all of the sides 84 as shown.

Each of the individual buses 85, 86, 87, 88, 89 and 90 are connected, respectively, by electrical leads 92, 93, 94, 95, 96, and 97 to voltage taps of the secondary windings 98 of a usual transformer 99, while the common bus 91 is connected thereto by a lead 101. Transformer 99 is energized by current supplied from a suitable power source (not shown) through leads 102 connected to the primary windings 103 thereof.

With the use of a transformer and with the film sections electrically interconnected as described a predetermined current appropriate to the electrical resistance of each of the film sections is readily provided to develop heat of a desired temperature at each of the film areas whereby substantially uniform heating throughout the area of visibility of the glass unit is achieved. It is a simple matter to tap the secondary winding of the transformer at those points which will supply those current values to each film section which will result in each area developing that heat necessary to effect the desired temperature in the glass panel to prevent ice formation.

The constructions hereinabove described afford an effective method of heating an electrically conductive laminated glass-plastic unit which is of unusual configuration and which by reason of its shape would be subject to localized heating if usual methods of supplying current to the conductive layer were utilized. With the present construction wherein the conductive film is sectionalized clear vision is assured throughout the field desired. Heating of the area of vision is effected in a uniform manner without developing heat concentrations which may adversely affect the thermoplastic layers. By dividing the conductive film into sections of appropriate outline and by providing a sufficient number of sections as needed to heat the view field glass units of unusual configurations are effectively and efficiently accommodated.

The present invention is adapted for use with windshields or other viewing structures of aircraft, or of any vehicle or apparatus where ice formations pose a problem and wherein such windshields comprise two sheets of glass with an interposed layer of non-brittle transparent thermoplastic material. The heating of such windshields is readily and efficiently accomplished and without distortion or other impairment of the optical properties thereof.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. An electrically conducting laminated glass unit comprising two layers of glass and an interposed layer of transparent thermoplastic material, a plurality of sections of transparent electrically conductive film provided on one of said layers of glass to cover substantially the view field thereof, and a plurality of electrodes provided along opposite edges of each of said film sections for introduction of current to such film sections for generating heat to increase the temperature of said glass layer carrying said film sections certain of said plurality of electrodes being electrically associated with but one section of conductive film and the others of said plurality of electrodes being associated with a plurality of sections of conductive film.

2. An electrically conducting laminated glass unit comprising two sheets of glass and an interposed layer of transparent thermoplastic material, a plurality of sections of transparent electrically conductive film provided on the inner surface of one of said glass sheets, said plurality of film sections being of substantially like configuration, a plurality of electrodes, each common to a group of said film sections and each extending along and interconnecting like edges of such group of film sections, individual electrodes provided along the opposite edges of each of said film sections, and electrical conductors electrically connecting each of the individual electrodes of said film sections in a group with an individual electrode of a film section in another group.

3. An electrically conducting laminated glass unit comprising two sheets of glass and an interposed layer of transparent thermoplastic material, a plurality of sections of transparent electrically conductive film provided on the inner surface of one of said glass sheets, said plurality of film sections being of substantially like configuration, a plurality of electrodes, each common to a group of said film sections and each extending along the interconnecting like edges of such group of film sections, individual electrodes provided along the opposite edges of each of said film sections, and electrical conductors electrically connecting each of the individual electrodes of said film sections in a group with an individual electrode of a film section in another group, said film sections being of such surface areas that the combined surface areas of each pair of electrically connected film sections is substantially equal to the combined surface areas of each other pair.

4. An electrically conducting laminated glass unit comprising two sheets of glass and an interposed layer of transparent thermoplastic material, a plurality of sections of transparent electrically conductive film provided on the inner surface of one of said glass sheets, and a plurality of electrodes along opposite edges of said film sections with various of said electrodes being common to a pair of film sections for interconnecting each film section with the film section adjacent thereto to place all of said film sections in electrical series connection.

5. An electrically conducting laminated glass unit comprising two sheets of glass and an interposed layer of transparent thermoplastic material, a plurality of sections of transparent electrically conductive film provided on the inner surface of one of said glass sheets, said plurality of film sections being of substantially like configuration, a plurality of individual electrodes disposed one along like edges of each of said film sections, a common electrode extending along and interconnecting like edges opposite said first-mentioned edges, and electrical conductors connecting said indivdiual electrodes and said common electrode to a transformer.

6. An electrically conducting laminated glass unit of irregular configuration comprising two layers of glass and an interposed layer of transparent thermoplastic material, a plurality of sections of transparent electrically conductive film provided on one of said layers of glass to cover substantially the view field thereof, the overall outline configuration of said plurality of sections being substantially like the configuration of said glass unit, and a plurality of electrodes provided along opposite edges of each of said film sections for introduction of current to such film sections for generating heat uniformly throughout said viewing field of said glass layer carrying said film sections certain of said plurality of electrodes being electrically associated with but one section of conductive film and the others of said plurality of electrodes being associated with a plurality of sections of conductive film.

7. An electrically conducting laminated glass unit comprising two sheets of glass and an interposed layer of transparent plastic material, a plurality of adjacent strips of transparent electrically conducting material on at least one of said sheets of glass, at least one of said strips being of a different length than others of said strips, said adjacent strips being insulated from each other at their side margins and having their end margins located adjacent opposite edges of said laminated glass unit, and current conducting means connected, respectively, to said plurality of strips of conducting material at the end margins thereof, said current conducting means being electrically interconnected to provide a substantially uniform heating effect throughout the areas of said glass unit which are bounded by said plurality of strips of conducting material.

8. An electrically conducting laminated glass unit of irregular configuration comprising two sheets of glass and an interposed layer of transparent thermoplastic material, a plurality of sections of transparent electrically conductive film provided on the inner surface of one of said glass sheets, the overall outline configuration of said plurality of sections being substantially like the configuration of said glass unit, a plurality of individual electrodes along one edge of each of said film sections, and a common electrode extending along and interconnecting edges of said film sections opposite the edges thereof having said individual electrodes.

9. An electrically conducting laminated glass unit of irregular configuration comprising two sheets of glass and an interposed layer of transparent thermoplastic material, a plurality of sections of transparent electrically conductive film provided on the inner surface of one of said glass sheets, the overall outline configuration of said plurality of sections being substantially like the configuration of said glass unit, a plurality of individual electrodes along one edge of each of said film sections, a common electrode extending along and interconnecting edges of said film sections opposite the edges thereof having said individual electrodes, and means for providing predetermined voltages across said film sections to develop heat to produce substantially like temperatures at each of said film sections.

10. An electrically conducting laminated glass unit of irregular configuration comprising two sheets of glass and an interposed layer of transparent thermoplastic material, a plurality of sections of transparent electrically conductive film provided on the inner surface of one of said glass sheets, the overall outline configuration of said plurality of sections being substantially like the configuration of said glass unit, said individual sections being of like configurations but having unlike dimensions, a plurality of individual electrodes along one edge of each of said film sections, a common electrode extending along and interconnecting edges of said film sections opposite the edges thereof having said individual electrodes, and means for providing predetermined voltages across said film sections to develop heat to produce substantially like temperatures at each of said film sections.

References Cited in the file of this patent

UNITED STATES PATENTS

| 2,119,680 | Long | June 7, 1938 |
| 2,557,983 | Linder | June 26, 1951 |
| 2,569,340 | Sarno et al. | Sept. 25, 1951 |
| 2,640,904 | Gaiser | June 2, 1953 |
| 2,648,754 | Lytle | Aug. 11, 1953 |
| 2,650,890 | Bledsoe | Sept. 1, 1953 |

FOREIGN PATENTS

| 665,053 | Great Britain | Jan. 16, 1952 |